UNITED STATES PATENT OFFICE 2,146,082

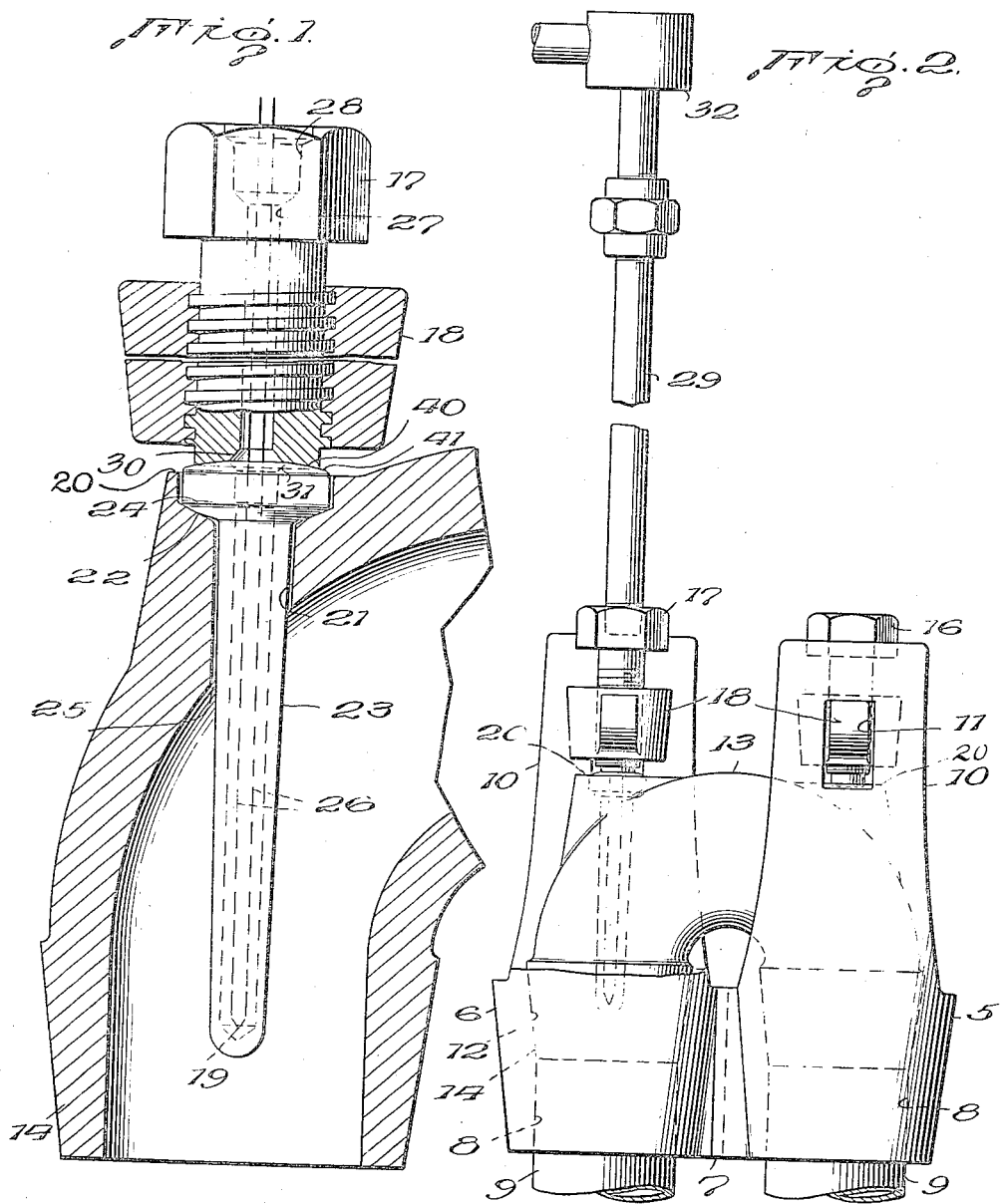

THERMOCOUPLE MOUNTING

William K. McCoy, Pittsburgh, Pa., assignor to Gulf Oil Corporation, Pittsburgh, Pa., a corporation of Pennsylvania Application June 3, 1937, Serial No. 146,293

3 Claims. (Cl. 136—4)

This invention or discovery relates to thermocouple mountings; and it comprises, in combination with a detachable return pipe or tube bend and yoke means for retaining the bend, a thermocouple well extending into the return bend, a thermocouple in said well, a screw cooperating with the yoke to hold the well and the bend in place, and electrical connections for the thermocouple; all as more fully hereinafter set forth and as claimed.

In modern pressure tube still operations in oil refining it is desirable to know the temperature of the oil at various parts of the still, as for example by means of thermocouples suitably located. Positioning of thermocouples presents some difficulties. The still must be taken down from time to time, and cleaning devices run through the tubes, so that it is impracticable to insert thermocouples directly in the tubes. It has been proposed to attach thermocouples to the outside of the tubes, but this arrangement does not give as direct a response to temperature as is desirable.

According to the present invention I provide an improved way of mounting thermocouples in tube stills, whereby the thermocouples extend directly into the tubes, but are automatically taken out of the way when the still is taken down. This object is achieved by providing a detachable return bend and yoke means, with a thermocouple well extending into the return bend, and a perforate screw for simultaneously retaining the thermocouple well and return bend in place. The thermocouple connections are conveniently brought through the screw. Thus when the return bend is detached, the thermocouple and connections are automatically and simultaneously detached.

An example of a specific embodiment of the invention is shown, more or less diagrammatically, in the accompanying drawing, in which Fig. 1 is a view partly in elevation and partly in vertical section of a thermocouple fitting within the purview of the present invention, and Fig. 2 is a view in elevation of the apparatus of Fig. 1 showing the complete return bend and fittings.

In the drawing there is shown one form of return bend fitting for tube stills and the like, to which the invention can be applied. The fitting comprises a double socket member formed of two similar elements 5 and 6 keyed together as at 7 and having bores 8 adapted for the reception of the tubes or pipes 9 of the still. Elements 5 and 6 are ordinarily affixed permanently to the tubes, as by swaging or welding the tubes therein. Each element has two upwardly extending arms 10, orificed as at 11, and has a tapered socket 12. A return bend is provided in the form of a U-shaped elbow 13 having tapered ends 14 engaging sockets 12. The bend is held firmly against the sockets by a pair of screws, 16 and 17, threadedly engaging a pair of yokes 18, the ends of which enter holes 11. By tightening the screws the return bend is pressed firmly in the sockets. Two seating members or seats 20 are provided integrally on the bend as shown.

According to the invention one of the seats 20 is bored through as at 21 and is provided with a shoulder 22. The shoulder is adapted for reception of a thermocouple well 23 having a flanged head 24 adapted to rest on the shoulder. The thermocouple well is arranged to leave a slight clearance between it and the bore 21, as indicated at 25, and advantageously shoulder 22 is given a conical contour (cone angle about 135°) and the lower side of the flanged head a spherical contour. This insures a tight seal.

In the well is positioned a thermocouple which is shown diagrammatically as comprising two wires 26 of different metals (e. g. iron and constantan) joined together as at 19. Screw 17 is tubular; it has a central bore 27 extending therethrough. At the upper end of the screw a threaded socket 28 is provided for attachment of a conventional conduit 29. The lower end of this bore is flared conically as at 30 and abuts the upper end of bore 21 which is similarly flared conically as at 31.

Conduit 29 carries the electrical connections (not shown) for the thermocouple and is usually connected to a conventional junction box 32, as shown.

The apparatus is shown in Figs. 1 and 2 in its assembled form, as it appears when in use. When it is desired to take down the still for cleaning, screw 16 is removed or loosened and conduit 29 and screw 17 are removed, together with the yoke. Thereupon the thermocouple well can be lifted out. The return bend can now be readily removed giving access to the interior of the tubing. The thermocouple and its mounting are completely out of the way and not subject to damage.

The various parts of the apparatus can be constructed of suitable materials in a manner known per se. The thermocouple well and other parts can conveniently be of steel or stainless steel. If the parts are properly machined, usually no gasket is necessary but if desired gasket means can be interposed at the various joints.

What I claim is:

1. In combination with a detachable return bend for tubing and a double socket member for the bend having outwardly extending portions and yoke means engaging the outwardly extending portions, a thermocouple mounting comprising a thermocouple well extending into the return bend, a thermocouple in said well, a screw threadedly engaging the yoke means and abutting the thermocouple well so as to hold the well and the bend in place, and electrical connections for the thermocouple extending out from the thermocouple well.

2. In combination, a return bend for tubing, the bend having an orifice opposite the end of the tubing and being so constructed and arranged as to provide a flanged socket around the orifice, a double socket member engaging the return bend, a flanged thermocouple well extending through the orifice and seated in the socket, a thermocouple in the well, a yoke, means attaching the yoke to the double socket member, a screw threadedly engaging the yoke and abutting the thermocouple well and adapted upon being tightened to force the thermocouple well against the socket and the return bend against the tubing, and electrical connections for the thermocouple extending out from the well.

3. A thermocouple mounting comprising, in combination with a dual socket member containing a detachable return bend and having yoke means and yoke supporting means for retaining the bend to tubing, a thermocouple well extending into the return bend, a thermocouple extending into said well, a tubular screw threadedly engaging the yoke means and abutting the well, and adapted upon being tightened to compress the thermocouple well against the return bend and to retain the return bend to the tubing, and electrical connections for the thermocouple extending through the tubular screw.

WILLIAM K. McCOY.